US012128391B2

(12) United States Patent
Zeng et al.

(10) Patent No.: US 12,128,391 B2
(45) Date of Patent: Oct. 29, 2024

(54) METHOD FOR PREPARING CARBONIZED SILK PHOTOCATALYST AND USE THEREOF

(71) Applicant: GUANGDONG UNIVERSITY OF PETROCHEMICAL TECHNOLOGY, Guangdong (CN)

(72) Inventors: Xingye Zeng, Guangdong (CN); Hanlu Wang, Guangdong (CN); Shufeng Shan, Guangdong (CN); Zhanjun Zhang, Guangdong (CN); Shikui Wu, Guangdong (CN); Rujin Zhou, Guangdong (CN); Cunhui Lin, Guangdong (CN)

(73) Assignee: GUANGDONG UNIVERSITY OF PETROCHEMICAL TECHNOLOGY, Guangdong (CN)

( * ) Notice: Subject to any disclaimer, the term of this patent is extended or adjusted under 35 U.S.C. 154(b) by 375 days.

(21) Appl. No.: 17/635,402

(22) PCT Filed: Jul. 17, 2020

(86) PCT No.: PCT/CN2020/102830
§ 371 (c)(1),
(2) Date: Feb. 15, 2022

(87) PCT Pub. No.: WO2021/027491
PCT Pub. Date: Feb. 18, 2021

(65) Prior Publication Data
US 2022/0288575 A1    Sep. 15, 2022

(30) Foreign Application Priority Data

Aug. 15, 2019  (CN) .......................... 201910752163.8

(51) Int. Cl.
*B01J 35/39* (2024.01)
*B01J 21/18* (2006.01)
(Continued)

(52) U.S. Cl.
CPC ............... *B01J 35/39* (2024.01); *B01J 21/18* (2013.01); *B01J 35/58* (2024.01); *B01J 37/0203* (2013.01);
(Continued)

(58) Field of Classification Search
None
See application file for complete search history.

(56) References Cited

FOREIGN PATENT DOCUMENTS

| CN | 101338221 A | * | 1/2009 |
| CN | 101455975 A |   | 6/2009 |

(Continued)

OTHER PUBLICATIONS

CN109797470A, English translation (Year: 2019).*
(Continued)

*Primary Examiner* — Stefanie J Cohen
(74) *Attorney, Agent, or Firm* — The Webb Law Firm (57) ABSTRACT

Disclosed is a method for preparing a carbonized silk photocatalyst, comprising: soaking a natural silk and an activator in water, taking out the soaked silk, and drying the same; and roasting the dried silk under the protection of an inert atmosphere to prepare a carbonized silk photocatalyst. Also disclosed is a method for photocatalytic desulfurization of a fuel oil, comprising: mixing a fuel oil to be desulfurated, an extraction agent and a carbonized silk photocatalyst, with air being used as an oxidizing agent, to conduct a photocatalytic reaction under light irradiation, and separating an upper oil phase to obtain a desulfurated fuel oil. The catalyst has a simple preparation process, and can effectively reduce dibenzothiophene sulfides, which are difficult to remove, in
(Continued)

the fuel oil under UV light radiation. Desulfurization can be achieved at room temperature, and reaction conditions are mild.

6 Claims, 6 Drawing Sheets

(51) Int. Cl.
    *B01J 35/58*     (2024.01)
    *B01J 37/02*     (2006.01)
    *B01J 37/08*     (2006.01)
    *C10G 27/04*     (2006.01)

(52) U.S. Cl.
    CPC ............ *B01J 37/084* (2013.01); *C10G 27/04* (2013.01); *C10G 2300/703* (2013.01)

(56) References Cited

FOREIGN PATENT DOCUMENTS

| | | | |
|---|---|---|---|
| CN | 101376821 B | | 5/2012 |
| CN | 102614904 A | | 8/2012 |
| CN | 103252214 A | | 8/2013 |
| CN | 105016324 A | | 11/2015 |
| CN | 105845954 A | | 8/2016 |
| CN | 106076417 A | | 11/2016 |
| CN | 109626357 A | | 4/2019 |
| CN | 109626370 A | | 4/2019 |
| CN | 109650374 A | | 4/2019 |
| CN | 109797470 A | * | 5/2019 |
| CN | 110560177 A | | 12/2019 |
| JP | 2000288339 A | | 10/2000 |

OTHER PUBLICATIONS

CN-101338221-A, English translation (Year: 2009).*
Han et al., "Preparation of BiVO4/SBA-15 catalyst and its performance in the photocatalytic oxidation desulfurization", Journal of Fuel Chemistry and Technology, 2019, pp. 191-198, vol. 47:2, (English-language abstract included).
Liu et al., "Preparation of La3+/TiO2 hollow microsphere and its photocatalytic oxidation desulfurization performance of model gasoline [J]", Chinese Journal of Environmental Engineering, 2018, pp. 3371-3378, vol. 12:12, (English-language abstract included).
Wang et al., "Silk-derived graphene-like carbon with high electrocatalytic activity for oxygen reduction reaction", RSC Adv., 2016, pp. 34219-34224, vol. 6.
Zeng et al., "Deep Desulfurization of Liquid Fuels with Molecular Oxygen through Graphene Photocatalytic Oxidation" Applied Catalysis B: Environmental, 2017, pp. 1-34.

* cited by examiner

METHOD FOR PREPARING CARBONIZED SILK PHOTOCATALYST AND USE THEREOF

CROSS-REFERENCE TO RELATED APPLICATIONS

The present application is the United States national phase entry under 35 USC § 371 of International Application PCT/CN2020/102830, filed Jul. 17, 2020, which claims priority to Chinese Patent Application No. 201910752163.8, filed Aug. 15, 2019, the disclosures of which are hereby incorporated by reference in their entirety.

BACKGROUND

Technical Field

The present disclosure relates to a catalyst material for desulfurization of a fuel oil, and more particularly, to a method for preparing a carbonized silk photocatalyst and use thereof.

Technical Considerations

With the popularity of automobiles, the environmental pollution caused by automobile exhaust has seriously affected people's production and life. Therefore, China has stepped up to revise and put forward clean fuel oil standards with higher requirements. The "National-V" Standard for fuel oil was implemented nationwide in 2017, which stipulated that a maximum sulfur content in a fuel oil should not exceed 10 mg/kg. Since 2019, the more stringent "National-VIA" Standard has been discussed and implemented to continuously promote the improvement of air quality. At present, fuel oil desulfurization technologies are mainly divided into two categories: a hydrodesulfurization technology and a non-hydrodesulfurization technology. The hydrodesulfurization technology is widely used in industry currently, but this technology has the disadvantage of a poor removal effect of thiophene compounds, a large equipment investment, a high requirement and a high operating cost. The non-hydrodesulfurization technology mainly comprises oxidation desulfurization, extraction desulfurization, adsorption desulfurization and photocatalytic desulfurization. The photocatalytic desulfurization technology is a promising novel desulfurization technology due to the advantages of environmental protection, carbon neutrality and sustainable production.

At present, the photocatalytic desulfurization technology is mainly based on a semiconductor photocatalyst. For example, Na Han, et al. reported a method for photocatalytic desulfurization by using $BiVO_4$/SBA-15 catalyst (Na Han, Zhengli Chen, Wei Su, et al., preparation of $BiVO_4$/SBA-15 catalyst and its performance in the photocatalytic oxidation desulfurization. Journal of Fuel Chemistry and Technology, 2019, 47 (02): 191-198); and Bulei Liu, et al. reported a method for removing a sulfide from model gasoline with $TiO_2/La^{3+}$, and the desulfurization rate can reach 91.5% after light irradiation for 210 minutes (Bulei Liu, Gal Zhang, Min Gao, et al., preparation of $La^{3+}/TiO_2$ hollow microsphere and its photocatalytic oxidation desulfurization performance of model gasoline. Chinese Journal of Environmental Engineering, 2018, 12 (12): 3371-3378).

Although the semiconductor photocatalyst shows a good desulfurization performance, the prices of the semiconductor materials are limited by their reserves and wide use.

In recent years, carbon materials have emerged as the photocatalysts. For example, CN109650374A discloses a method for preparing a graphene-like carbon material, which is mainly based on a result of high-temperature carbonization of bacteria and culture medium, and the obtained carbon material is rich in phosphorus, oxygen, nitrogen and sulfur. CN109626370A discloses a biomass-based porous carbon material based on platanus orientalis seeds, and an activator used is mainly solid alkali. CN109626357A discloses an ultrafine carbon nano tube and a preparation method thereof. These carbon materials photocatalysts are mainly based on carbon materials such as graphene and graphene oxide, carbon nano tubes and porous carbon, and have not been used for photocatalytic desulfurization research. Moreover, these carbonized materials are difficult to meet the needs of modern industrial production due to a high cost or a long reaction time. In the huge family of carbon materials, there is also a kind of biomass carbon materials, which have the advantages of green sustainability, abundant impurity elements and low price.

Silk is a natural fibrin with a high molecular weight, and contains carbon, nitrogen, oxygen, hydrogen and other elements. Generally speaking, if the silk is directly carbonized at a high temperature, the resulting carbonized materials are compact and have fewer active functional groups and low photocatalytic activities duce to the occurrence of deoxidation and dehydrogenation reactions at the high temperature. At present, there is no report of preparing a photocatalyst for desulfurization of a fuel oil by using the silk. How to prepare a photocatalyst with a good performance by using the silk and apply the photocatalyst to desulfurization of the fuel oil, so as to expand the use of the silk as a traditional material and provide a novel carbon material for photocatalytic desulfurization of the fuel oil, has become a technical problem to be solved by researchers in the art.

SUMMARY

In order to overcome the problems in the prior art, the objective of the present disclosure is to provide a method for preparing a carbonized silk photocatalyst and use thereof in photocatalytic desulfurization of a fuel oil.

In the present disclosure, a natural silkworm cocoon and an activator are soaked for carbonization to prepare a photocatalyst with a low cost and a high activity. The present disclosure not only expands the use of silk as a traditional material, but also provides a novel carbon material for photocatalytic desulfurization of a fuel oil.

In order to achieve the above objectives, the technical solution used in the present disclosure is as follows.

The present disclosure provides a method for preparing a carbonized silk photocatalyst, which comprises the following steps of:

1) soaking a natural silk and an activator in water, taking out the soaked silk, and drying the same; and 2) roasting the dried silk under the protection of an inert atmosphere to obtain a carbonized silk photocatalyst, wherein in the step 1), the activator is one or more selected from the group consisting of oxalic acid, phosphotungstic acid, citric acid, lauric acid, boric acid and potassium chloride.

In non-limiting embodiments or aspects, in the step 1) of the method for preparing the carbonized silk photocatalyst, a mass ratio of the natural silk to the activator is 1:(0.1-0.3). In non-limiting embodiments or aspects, the mass ratio of the natural silk to the activator is 1:(0.15-0.25). In non-limiting embodiments or aspects, the mass ratio of the natural silk to the activator is 1:0.2.

In non-limiting embodiments or aspects, in the step 1) of the method for preparing the carbonized silk photocatalyst, the natural silk is prepared by the following method, comprising: washing the natural silkworm cocoon with water, and then cutting the washed silkworm cocoon into pieces to obtain flaky silk. The washing with water aims to wash off impurities on the surface of the silkworm cocoon. An area of the pieces is preferably 1 cm$^2$ (1 cm×1 cm). The flaky silk is used as a raw material to prepare the carbonized silk photocatalyst.

In non-limiting embodiments or aspects, in the step 1) of the method for preparing the carbonized silk photocatalyst, a ratio of the natural silk to the water used for soaking is 1 g:(50 mL to 200 mL). More preferably, the ratio of the natural silk to the soaking water is 1 g:(80 mL-120 mL).

In non-limiting embodiments or aspects, in the step 1) of the method for preparing the carbonized silk photocatalyst, the soaking lasts for 12 hours to 24 hours.

In non-limiting embodiments or aspects, in the step 1) of the method for preparing the carbonized silk photocatalyst, the water used for soaking is deionized water.

In non-limiting embodiments or aspects, in the step 1) of the method for preparing the carbonized silk photocatalyst, the drying is carried out in vacuum at 35° C. to 50° C. for 20 hours to 30 hours. More preferably, the drying is carried out in vacuum at 38° C. to 42° C. for 22 hours to 26 hours.

In non-limiting embodiments or aspects, in the step 2) of the method for preparing the carbonized silk photocatalyst, the inert atmosphere is one or more selected from the group consisting of nitrogen atmosphere, helium atmosphere, neon atmosphere and argon atmosphere. More preferably, the inert atmosphere is the helium atmosphere or the argon atmosphere.

In non-limiting embodiments or aspects, in the step 2) of the method for preparing the carbonized silk photocatalyst, a gas flow rate of the inert atmosphere is 3 mL/min to 12 mL/min. More preferably, the gas flow rate of the inert atmosphere is 5 mL/min to 10 mL/min.

In non-limiting embodiments or aspects, in the step 2) of the method for preparing the carbonized silk photocatalyst, the roasting is carried out at 450° C. to 900° C. More preferably, the roasting is carried out at 500° C. to 700° C.

In non-limiting embodiments or aspects, in the step 2) of the method for preparing the carbonized silk photocatalyst, the roasting specifically comprises heating from room temperature to the above roasting temperature at 4° C./min to 6° C./min, and keeping for 3 hours to 5 hours. More preferably, the roasting specifically comprises heating from room temperature to the above roasting temperature at 5° C./min, and keeping for 3.5 hours to 4.5 hours.

In non-limiting embodiments or aspects, in the step 2) of the method for preparing the carbonized silk photocatalyst, further comprising a step of washing a carbonized silk photocatalyst after roasting. The washing specifically comprises washing with water and alcohol, and the washing aims to remove residual activator on the surface of the carbonized silk photocatalyst.

The present disclosure provides use of the carbonized silk photocatalyst above, which is specifically used for photocatalytic desulfurization of the fuel oil.

A photocatalyst for desulfurization of a fuel oil is provided, wherein the photocatalyst for desulfurization of the fuel oil is prepared by the method for preparing the carbonized silk photocatalyst above.

The present disclosure further provides a specific method for using the photocatalyst, which is namely a method for photocatalytic desulfurization of a fuel oil.

The method for photocatalytic desulfurization of the fuel oil comprises the following steps of:
  mixing a fuel oil to be desulfurated, an extraction agent and a carbonized silk photocatalyst, with air being used as an oxidizing agent, to conduct a photocatalytic reaction under light irradiation, and
  separating an upper oil phase to obtain a desulfurated fuel oil,
  wherein the carbonized silk photocatalyst is prepared by the above method.

In non-limiting embodiments or aspects, in the method for photocatalytic desulfurization of the fuel oil, a volume ratio of the fuel oil to be desulfurated to the extraction agent is 1:(0.1-1). More preferably, the volume ratio of the fuel oil to be desulfurated to the extraction agent is 1:(0.15-0.8). Most preferably, the volume ratio of the fuel oil to be desulfurated to the extraction agent is 1:(0.16-0.5).

In non-limiting embodiments or aspects, in the method for photocatalytic desulfurization of the fuel oil, a ratio of the fuel oil to be desulfurated to the photocatalyst is 1 L:(0.3 g-1.5 g). More preferably, the ratio of the fuel oil to be desulfurated to the photocatalyst is 1 L:(0.33 g-1.33 g).

In non-limiting embodiments or aspects, in the method for photocatalytic desulfurization of the fuel oil, air is introduced to participate in a photocatalytic reaction, a flow rate of the air is 0 mL/min to 50 mL/min. More preferably, the flow rate of the air is 0 mL/min to 40 mL/min. When the flow rate of the air is 0 mL/min, which means that the air is not pumped into a reaction system by an air tube, oxygen in the reaction system comes from dissolved oxygen on the surface of the reaction solution contacted with the air; and when the flow rate of the air is not 0 mL/min, the reaction system pumps the air into a bottom portion of the reaction solution by the air tube, under an action of stirring, an air flow is dispersed in the reaction solution to escape, so that the oxygen is sufficient and contact is more sufficient. In addition, the flow rate of the pumped air may be controlled by an external flowmeter.

In non-limiting embodiments or aspects, in the method for photocatalytic desulfurization of the fuel oil, a sulfur content of the fuel oil to be desulfurated is 400 mg/L to 1,500 mg/L. More preferably, the sulfur content of the fuel oil to be desulfurated is 500 mg/L to 1,400 mg/L.

In non-limiting embodiments or aspects, in the method for photocatalytic desulfurization of the fuel oil, the extraction agent is one or more selected from the group consisting of methanol, ethanol, ethylene glycol, N-methyl pyrrolidone, N, N-dimethylformamide, acetonitrile, sulfolane and dimethyl sulfoxide. More preferably, the extraction agent is one or more selected from the group consisting of methanol, N-methyl pyrrolidone and acetonitrile. Most preferably, the extraction agent is acetonitrile.

In non-limiting embodiments or aspects, in the method for photocatalytic desulfurization of the fuel oil, a radiation light source of the photocatalytic reaction is an ultraviolet lamp (UV light source). More preferably, the radiation light source of the photocatalytic reaction is a high-pressure mercury lamp with a main wavelength of 365 nm.

In non-limiting embodiments or aspects, in the method for photocatalytic desulfurization of the fuel oil, the photocatalytic reaction is carried out at 20° C. to 30° C. More preferably, the photocatalytic reaction is carried out at 22° C. to 25° C.

In non-limiting embodiments or aspects, in the method for photocatalytic desulfurization of the fuel oil, the photocatalytic reaction lasts for 120 minutes to 180 minutes. More preferably, the photocatalytic reaction lasts for 130 minutes to 150 minutes.

In non-limiting embodiments or aspects, in the method for photocatalytic desulfurization of the fuel oil, the upper oil phase is separated by standing. Specifically, after the photocatalytic reaction, the upper oil phase, namely the desulfurized fuel oil is obtained by standing and layering.

The present disclosure has the beneficial effects as follows:

The catalyst according to the present disclosure has a simple preparation process, and can effectively reduce dibenzothiophene sulfides, which are difficult to remove, in the fuel oil under UV light radiation; desulfurization can be achieved at room temperature, and reaction conditions are mild. In the method for photocatalytic desulfurization of the fuel oil, the air is used as the oxidizing agent without adding explosive peroxides, which reduces potential safety hazards. The catalyst according to the present disclosure has a good application value in the desulfurization of a fuel oil.

DETAILED DESCRIPTION

Figure 1:
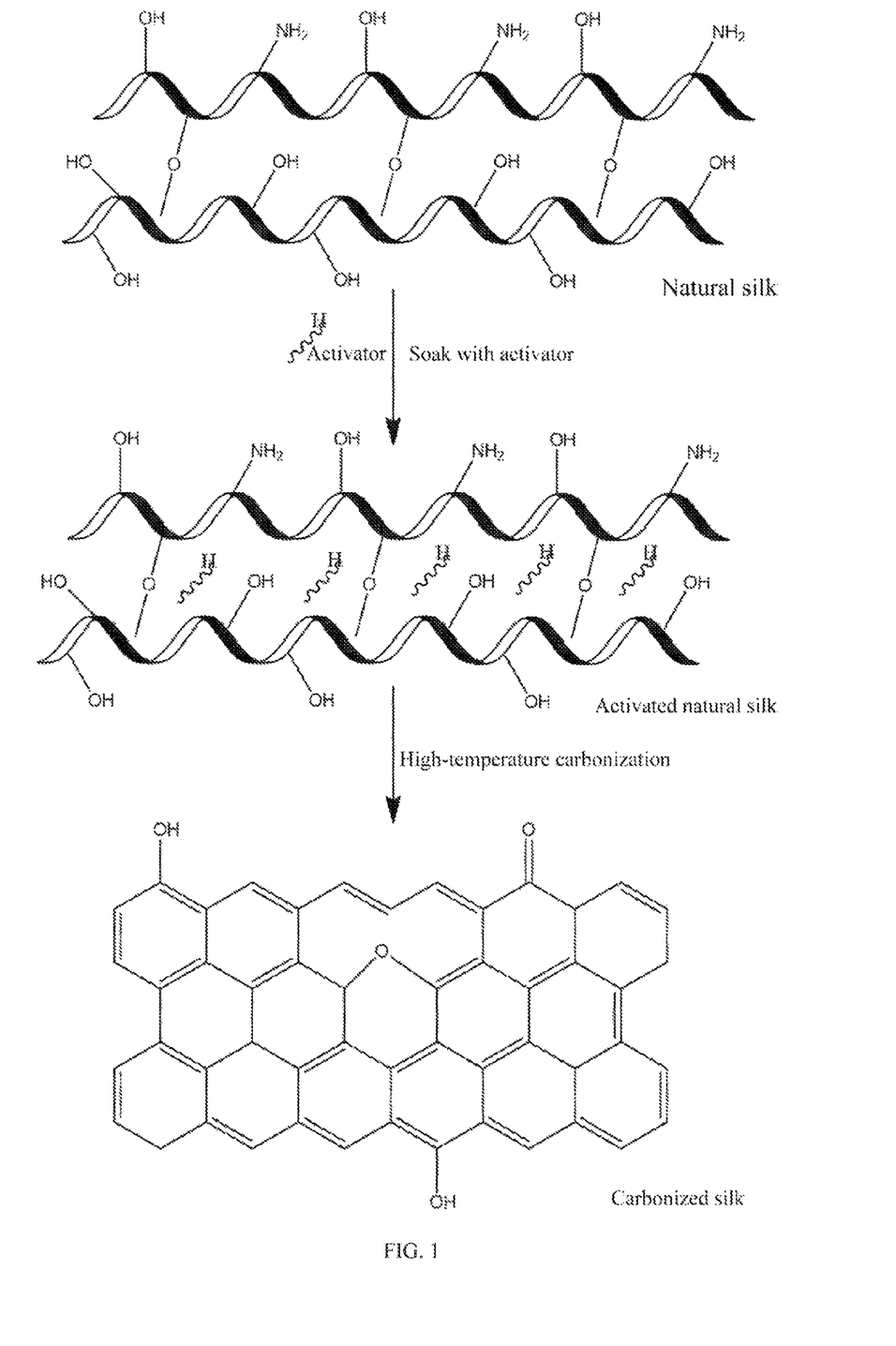
FIG. 1 is a schematic diagram of a silk carbonization mechanism.

FIG. 1 is a schematic diagram of a silk carbonization mechanism. With reference to FIG. 1, the mechanism for preparing the carbonized silk photocatalyst according to the present disclosure is described as follows: the natural silk, after being soaked in the activator solution for a certain period of time, absorbs a certain amount of activator. Under the protection of the inert atmosphere, deoxidation and denitrification reactions occur at a high temperature. Due to the existence of the activator, certain hydrogen atoms can be provided, which is beneficial for the dehydration reaction during carbonization, and the formation of highly graphitized material by the carbonized silk.

Figure 2:
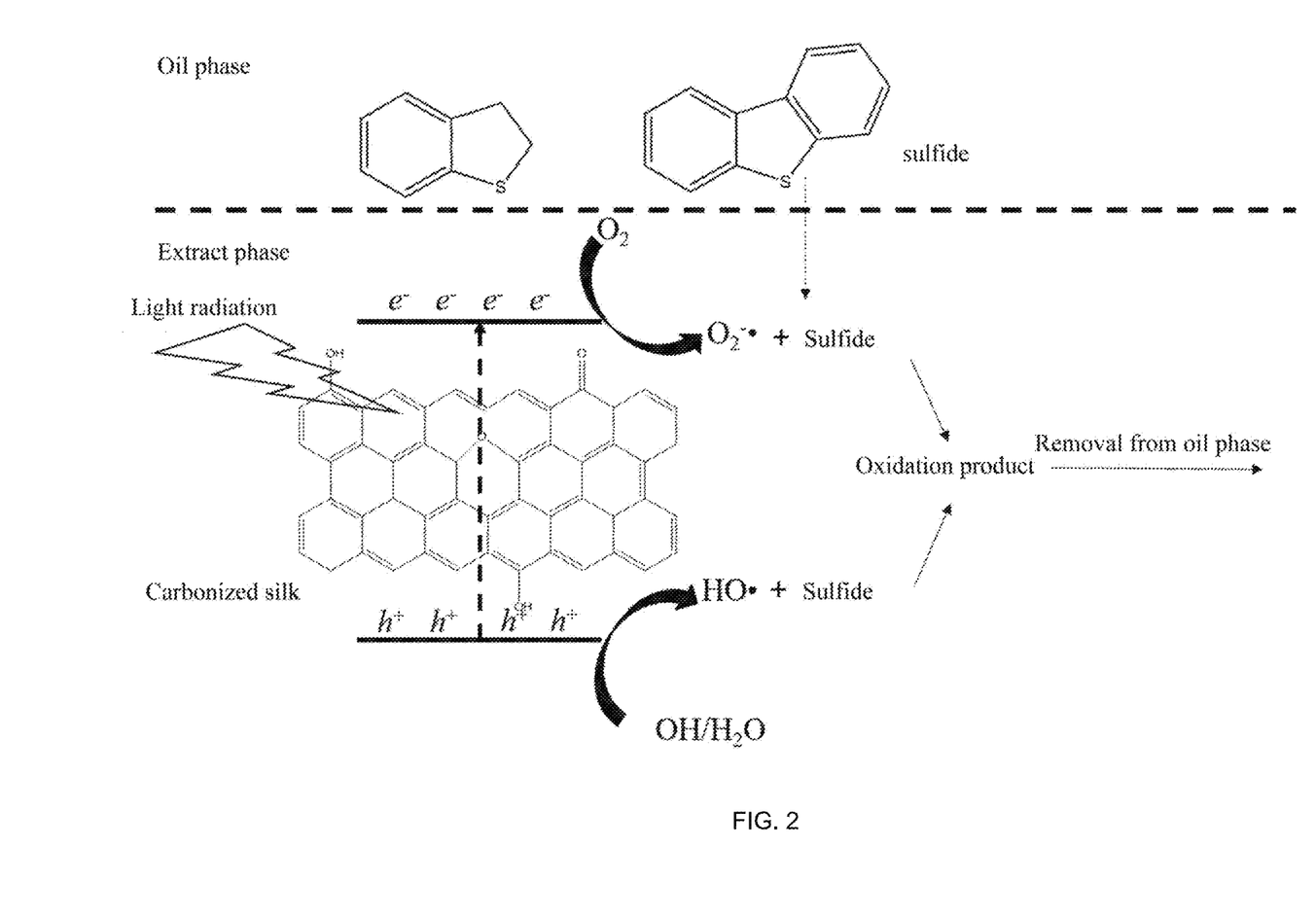
FIG. 2 is a schematic diagram of a photocatalytic desulfurization mechanism of a carbonized silk material.

FIG. 2 is a schematic diagram of a photocatalytic desulfurization mechanism of a carbonized silk material. With reference to FIG. 2, the mechanism of photocatalytic desulfurization of the fuel oil according to the present disclosure is described as follows: the sulfide exists in an oil phase, while the carbonized silk exists in the extract phase. The sulfide in the oil phase is transferred to the extract phase by extraction, and the carbonized silk generates active oxygen such as HO· and $O_2^-·$ under light radiation. The generated active oxygen oxidizes the sulfide to convert the sulfide into a highly polar sulfide, and the highly polar sulfide remains in the extract phase. With the progress of the oxidation reaction, the sulfide in the oil phase is continuously transferred to the extract phase and then removed, thus obtaining the oil phase with a low sulfur content.

The contents of the present disclosure are further described in detail hereinafter with reference to the specific examples. Unless otherwise specified, all the raw materials used in the examples may be obtained in conventional commercial ways.

Preparation Example 1

Natural silkworm cocoon was washed with deionized water for 3 times to wash off impurities on surface of the silkworm cocoon. Then the washed silkworm cocoon was cut into pieces with an area of about 1 cm² (1 cm×1 cm). 1 g of flaky silk and 0.1 g of phosphotungstic acid were soaked in 100 mL of deionized water for 24 hours, and then the soaked silk was taken out and dried in a vacuum drying oven at 40° C. for 24 hours. The dried silk was continuously placed in a tube furnace, argon was introduced into the tube furnace with a flow rate of 5 mL/min. The tube furnace was heated from room temperature to 700° C. at 5° C./min, and then the dried silk was roasted at 700° C. for 4 hours, and naturally cooled to room temperature to obtain the carbonized silk activated with the phosphotungstic acid. Finally, the carbonized silk was washed with distilled water and ethanol for 3 times to remove residual activator on the surface, and the sample was named LWS-700.

Figure 3:
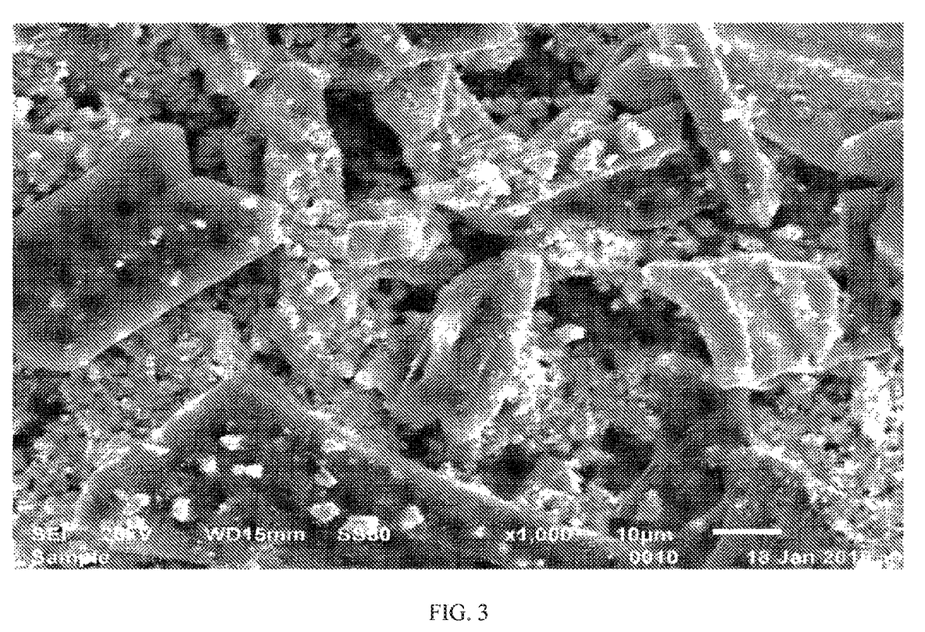
FIG. 3 is a scanning electron micrograph of a carbonized silk material activated with phosphotungstic acid according to the present disclosure.

The catalyst prepared in this example was characterized and analyzed, and the scanning electron micrograph of the carbonized silk material (LWS-700) activated with the phosphotungstic acid was shown in FIG. 3.

Preparation Example 2

Natural silkworm cocoon was washed with deionized water for 3 times to wash off impurities on surface of the silkworm cocoon. Then the washed silkworm cocoon was cut into pieces with an area of about 1 cm² (1 cm×1 cm). 1 g of flaky silk, 0.1 g of potassium chloride and 0.2 g of oxalic acid were soaked in 100 mL of deionized water for 18 hours, and then the soaked silk was taken out and dried in a vacuum drying oven at 40° C. for 24 hours. The dried silk was continuously placed in a tube furnace, argon was introduced into the tube furnace with a flow rate of 10 mL/min. The tube furnace was heated from room temperature to 500° C. at 5° C./min, and then the dried silk was roasted at 500° C. for 4 hours, and naturally cooled to room temperature to obtain the carbonized silk co-activated with the potassium chloride and the oxalic acid. Finally, the carbonized silk was washed with distilled water and ethanol for 3 times to remove residual activator on the surface, and the sample was named KCS-500.

Figure 4:
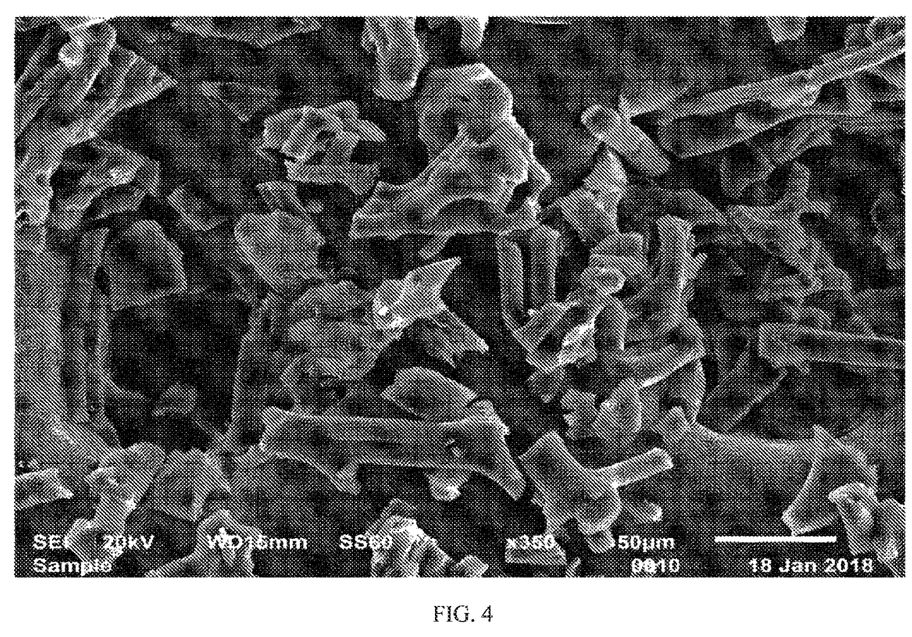
FIG. 4 is a scanning electron micrograph of a carbonized silk material co-activated with potassium chloride and oxalic acid according to the present disclosure.

The catalyst prepared in this example was characterized and analyzed, and the scanning electron micrograph of the carbonized silk material (KCS-500) co-activated with the potassium chloride and the oxalic acid was shown in FIG. 4.

Preparation Example 3

Natural silkworm cocoon was washed with deionized water for 3 times to wash off impurities on surface of the silkworm cocoon. Then the washed silkworm cocoon was cut into pieces with an area of about 1 cm² (1 cm×1 cm). 1 g of flaky silk and 0.2 g of boric acid were soaked in 100 mL of deionized water for 24 hours, and then the soaked silk was taken out and dried in a vacuum drying oven at 40° C. for 24 hours. The dried silk was continuously placed in a tube furnace, argon was introduced into the tube furnace with a flow rate of 5 mL/min. The tube furnace was heated from room temperature to 500° C. at 5° C./min, and then the dried silk was roasted at 500° C. for 4 hours, and naturally cooled to room temperature to obtain the carbonized silk activated with the boric acid. Finally, the carbonized silk was washed with distilled water and ethanol for 3 times to remove residual activator on the surface, and the sample was named PS-500.

Figure 5:
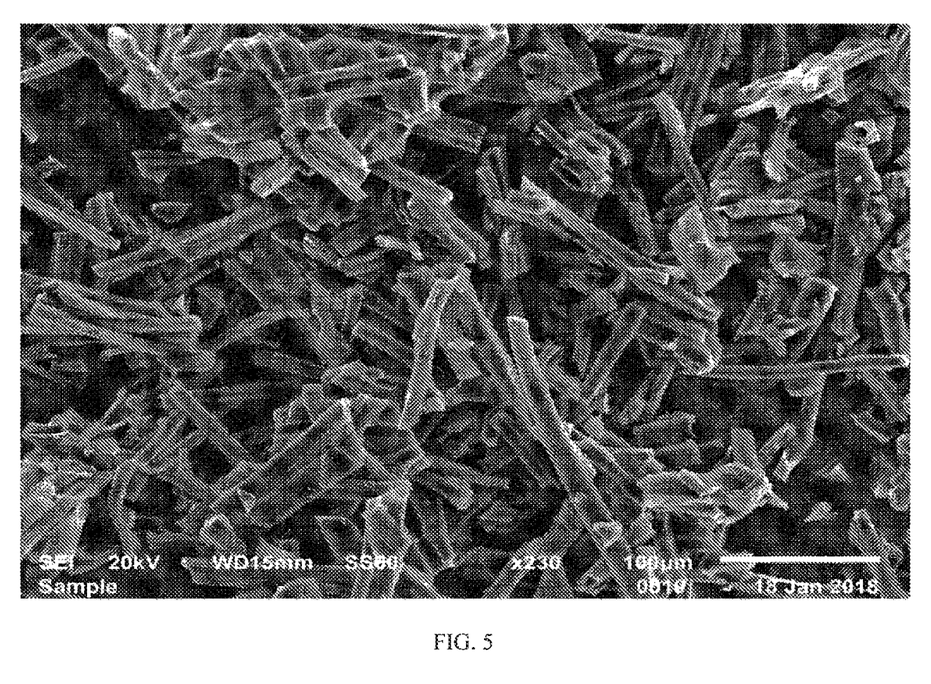
FIG. 5 is a scanning electron micrograph of a carbonized silk material activated with boric acid according to the present disclosure.

The catalyst prepared in this example was characterized and analyzed, and the scanning electron micrograph of the carbonized silk material (PS-500) activated with the boric acid was shown in FIG. 5.

Comparative Preparation Example

Natural silkworm cocoon was washed with deionized water for 3 times to wash off impurities on surface of the silkworm cocoon. Then the washed silkworm cocoons was cut into pieces with an area of about 1 cm$^2$ (1 cm x 1 cm). 1 g of flaky silk was soaked in 100 mL of deionized water for 12 hours, and then the soaked silk was taken out and dried in a vacuum drying oven at 40° C. for 24 hours. The dried silk was continuously placed in a tube furnace, argon was introduced into the tube furnace with a flow rate of 5 mL/min. The tube furnace was heated from room temperature to 500° C. at 5° C./min, and then the dried silk was roasted at 500° C. for 4 hours, and naturally cooled to room temperature to obtain the unactivated carbonized silk, which were named WH-500.

Figure 6:
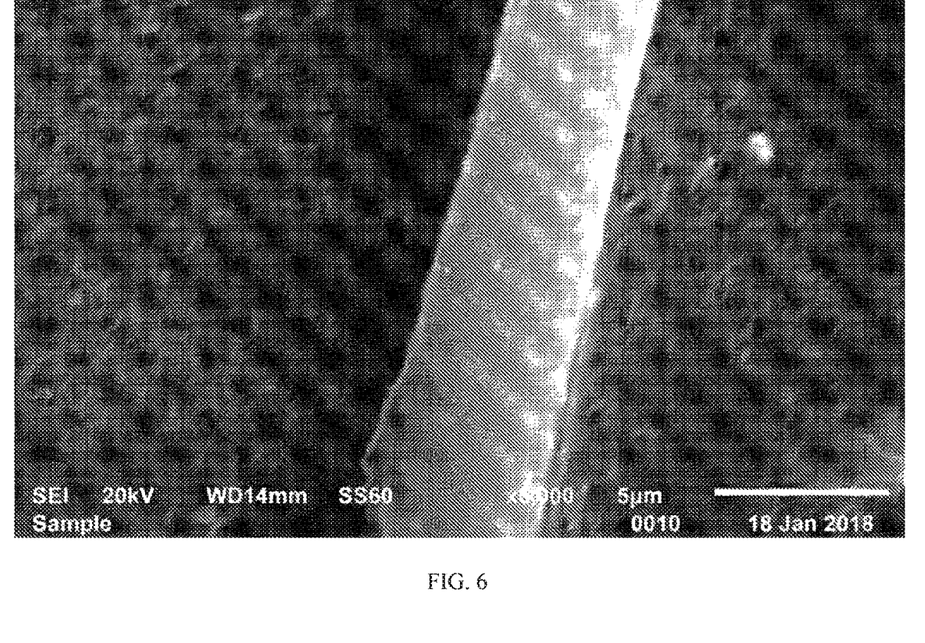
FIG. 6 is a scanning electron micrograph of a carbonized silk material without treatment with an activator according to the present disclosure.

The catalyst prepared in this example was characterized and analyzed, and the scanning electron micrograph of the carbonized silk material (WH-500) without treatment with the activator was shown in FIG. 6.

The catalysts prepared in Preparation Examples 1 to 3 and Comparative Preparation Example were subjected to desulfurization tests hereinafter. Illustratively, the fuel oil tested in the present disclosure was a simulated fuel oil composed of n-alkanes; and further, the fuel oil was a simulated fuel oil composed of n-decane and tetradecane, and a sulfur content of the simulated fuel oil was 500 ppm to 1,400 ppm. A sulfur source of the fuel oil was selected from dibenzothiophene (DBT).

The desulfurization test was specifically as follows:
Preparation of simulated fuel oil: dibenzothiophene was added into n-decane and n-tetradecane to prepare the simulated fuel oil with the sulfur content of 500 mg/L to 1,400 mg/L. For example, the simulated fuel oil with the sulfur content of 500 mg/L was prepared by adding 1.439 g of dibenzothiophene into 500 mL of n-decane and n-tetradecane.

Test method: the photocatalyst was added into a jacketed quartz flask provided with magnetic stirring and cooling circulating water, and then the simulated fuel oil and acetonitrile were added.

Air was pumped into the simulated fuel oil by an air pump, or no air was pumped. When no air was pumped, oxygen in the reaction system in the experiment came from dissolved oxygen on the surface of the reaction solution contacted with air. The cooling circulating water was maintained at 22° C. The mixture was stirred in the dark first, then reacted under the radiation of a high-pressure mercury lamp with a main wavelength of 365 nm, stood and then layered, the oil on upper layer was extracted, the sulfur content was determined by a gas chromatograph, and the desulfurization rate was calculated. The calculation formula of the desulfurization rate was as follows:

$$\text{Desulfurization rate} = (C_0 - C_t)/C_0 \times 100\% \qquad (1)$$

In formula (1):
$C_0$—initial concentration of sulfide in fuel oil, unit: mg/L;
$C_t$—concentration of sulfide in fuel oil at the reaction time t, unit: mg/L.

The desulfurization tests of the catalysts prepared in Preparation Examples 1 to 3 and Comparative Preparation Example were further described respectively hereinafter.

Application Example 1

0.01 g of LWS-700 prepared in Preparation Example 1 was added into 15 mL of simulated fuel oil containing DBT with a sulfur content of 500 mg/L, 7.5 mL of acetonitrile was added, and the flow rate of air was 20 mL/min. The mixture was stirred in the dark for 20 minutes first, and then irradiated under UV light for 140 minutes to extract the upper oil, the sulfur content was determined, and the desulfurization rate was calculated to be 99.5%.

Application Example 2

0.005 g of LWS-700 prepared in Preparation Example 1 was added into 15 mL of simulated fuel oil containing DBT with a sulfur content of 500 mg/L, 5 mL of acetonitrile was added, and the flow rate of air was 10 mL/min. The mixture was stirred in the dark for 20 minutes first, and then irradiated under UV light for 140 minutes to extract the upper oil, the sulfur content was determined, and the desulfurization rate was calculated to be 96.7%.

Application Example 3

0.008 g of KCS-500 prepared in Preparation Example 2 was added into 15 mL of simulated fuel oil containing DBT with a sulfur content of 500 mg/L, 2.5 mL of acetonitrile was added, and the flow rate of air was 40 mL/min. The mixture was stirred in the dark for 20 minutes first, and then irradiated under UV light for 140 minutes to extract the upper oil, the sulfur content was determined, and the desulfurization rate was calculated to be 97.7%.

Application Example 4

0.02 g of PS-500 prepared in Preparation Example 3 was added into 15 mL of simulated fuel oil containing DBT with a sulfur content of 500 mg/L, 7.5 mL of acetonitrile was added, and no air was pumped in. The mixture was stirred in the dark for 20 minutes first, and then irradiated under UV light for 140 minutes to extract the upper oil, the sulfur content was determined, and the desulfurization rate was calculated to be 93.7%.

Application Example 5

0.005 g of LWS-700 prepared in Preparation Example 1 was added into 15 mL of simulated fuel oil containing DBT with a sulfur content of 500 mg/L, 7.5 mL of acetonitrile was added, and the flow rate of air was 5 mL/min. The mixture was stirred in the dark for 20 minutes first, and then irradiated under UV light for 140 minutes to extract the upper oil, the sulfur content was determined, and the desulfurization rate was calculated to be 96.5%.

Application Example 6

0.005 g of LWS-700 prepared in Preparation Example 1 was added into 15 mL of simulated fuel oil containing DBT with a sulfur content of 800 mg/L, 7.5 mL of acetonitrile was added, and the flow rate of air was 20 mL/min. The mixture was stirred in the dark for 20 minutes first, and then irradiated under UV light for 140 minutes to extract the upper oil, the sulfur content was determined, and the desulfurization rate was calculated to be 98.5%.

Application Example 7

0.005 g of LWS-700 prepared in Preparation Example 1 was added into 15 mL of simulated fuel oil containing DBT with a sulfur content of 1,400 mg/L, 7.5 mL of acetonitrile was added, and the flow rate of air was 20 mL/min. The mixture was stirred in the dark for 20 minutes first, and then irradiated under UV light for 140 minutes to extract the upper oil, the sulfur content was determined, and the desulfurization rate was calculated to be 96.9%.

Application Example 8

0.005 g of LWS-700 prepared in Preparation Example 1 was added into 15 mL of simulated fuel oil containing DBT with a sulfur content of 500 mg/L, 7.5 mL of acetonitrile was added, and the flow rate of air was 20 mL/min. The mixture was stirred in the dark for 20 minutes first, and then irradiated under UV light for 140 minutes to extract the upper oil, the sulfur content was determined, and the desulfurization rate was calculated to be 98.9%.

Comparative Application Example 1

0.005 g of WH-500 prepared in Preparation Example 1 was added into 15 mL of simulated fuel oil containing DBT with a sulfur content of 500 mg/L, 7.5 mL of acetonitrile was added, and the flow rate of air was 20 mL/min. The mixture was stirred in the dark for 20 minutes first, and then irradiated under UV light for 140 minutes to extract the upper oil, the sulfur content was determined, and the desulfurization rate was calculated to be 63.7%.

Comparative Application Example 2

The same experiment was carried out by using graphene oxide as a desulfurization catalyst, referring to contents disclosed in *Deep desulfurization of liquid fuels with molecular oxygen through graphene photocatalytic oxidation* (Zeng X., Xiao X., Li Y., et al. Applied Catalysis B: Environmental, 2017, 209(15): 98-109). The graphene oxide was prepared by the modified Hummers method, and strong acid and a strong oxidizing agent needed to be used during preparation. There was a potential safety hazard of explosion during preparation, and a large amount of acid-containing wastewater could be produced during washing after reaction, so that an additional wastewater treatment unit was needed. Formic acid was added additionally during desulfurization, and a small amount of acid dissolved in the oil product could lead to the decline of oil product quality. Although the graphene oxide has a good desulfurization effect, the graphene oxide have the disadvantage of complicated preparation, high production cost, and difficult separation from the oil after desulfurization, so that the graphene oxide is not suitable for practical popularization and use.

Results of the desulfurization tests in Application Examples 1 to 8 and Comparative Application Examples 1 to 2 were shown in Table 1.

TABLE 1

Results of application tests

| Number | Catalyst | Consumption of catalyst (g/L) | Initial sulfur content (mg/L) | Flow rate of air (mL/min) | Consumption of acetonitrile (mL) | Reaction time (min) | Desulfurization rate (%) |
|---|---|---|---|---|---|---|---|
| Application Example 1 | LWS-700 | 0.67 | 500 | 20 | 7.5 | 140 | 99.5 |
| Application Example 2 | LWS-700 | 0.33 | 500 | 10 | 5 | 140 | 96.7 |
| Application Example 3 | KCS-500 | 0.53 | 500 | 40 | 2.5 | 140 | 97.7 |
| Application Example 4 | PS-500 | 1.33 | 500 | 0 | 7.5 | 140 | 93.7 |
| Application Example 5 | LWS-700 | 0.33 | 500 | 5 | 7.5 | 140 | 96.5 |
| Application Example 6 | LWS-700 | 0.33 | 800 | 20 | 7.5 | 140 | 98.5 |
| Application Example 7 | LWS-700 | 0.33 | 1400 | 20 | 7.5 | 140 | 96.9 |
| Application Example 8 | LWS-700 | 0.33 | 500 | 20 | 7.5 | 140 | 98.9 |
| Comparative Application Example 1 | WH-500 | 0.33 | 500 | 20 | 7.5 | 140 | 63.7 |
| Comparative Application Example 2 | Graphene oxide | 0.04 | 500 | 20 | 7.5 | 140 | 99.9 |

It could be seen from the above test results that, for the dibenzothiophene sulfide in the simulated fuel oil, the catalyst of the present disclosure could achieve a desulfurization rate of 93.7% to 99.5% under UV radiation within 140 minutes. Therefore, the catalyst of the present disclosure can effectively remove the dibenzothiophene sulfide in the fuel oil. The desulfurization can be achieved at room temperature without high temperature and high pressure, and reaction conditions are mild, so that the operation cost and the equipment maintenance cost are reduced. Air is used as the oxidizing agent, without needing to add an explosive peroxide (such as hydrogen peroxide, etc.), which reduces potential safety hazards. Compared with the existing catalysts, the catalyst of the present disclosure is simple in preparation, without producing a large amount of industrial wastewater during preparation, may use biomass raw materials, has a low cost, and has a good application value in the desulfurization of the fuel oil.

The above examples represent non-limiting embodiments or aspects of the present disclosure, but the embodiments or aspects of the present disclosure are not limited by the above examples. Any other changes, modifications, substitutions, combinations, and simplifications made without departing from the spirit and principle of the present disclosure should be equivalent substitute modes, and should be included in the scope of protection of the present disclosure.

The invention claimed is:

1. A method for photocatalytic desulfurization of a fuel oil, comprising:
    mixing a fuel oil to be desulfurated, an extraction agent and a carbonized silk photocatalyst, with air being used as an oxidizing agent, to conduct a photocatalytic reaction under light irradiation, and
    separating an upper oil phase to obtain a desulfurated fuel oil,
    wherein the carbonized silk photocatalyst is prepared by the method comprising:
    1) soaking a natural silk and an activator in water, taking out the soaked silk, and drying the same; and
    2) roasting the dried silk under the protection of an inert atmosphere to obtain a carbonized silk photocatalyst,
    wherein in step 1), the activator is one or more selected from the group consisting of oxalic acid, phosphotungstic acid, citric acid, lauric acid, boric acid, and potassium chloride.

2. The method for photocatalytic desulfurization according to claim 1, wherein a volume ratio of the fuel oil to be desulfurated to the extraction agent is 1:(0.1-1); and
    a ratio of the fuel oil to be desulfurated to the photocatalyst is 1 L:(0.3 g-1.5 g).

3. The method for photocatalytic desulfurization according to claim 2, wherein a sulfur content of the fuel oil to be desulfurated is 400 mg/L to 1,500 mg/L.

4. The method for photocatalytic desulfurization according to claim 2, wherein the extraction agent is one or more selected from the group consisting of methanol, ethanol, ethylene glycol, N-methyl pyrrolidone, N, N-dimethylformamide, acetonitrile, sulfolane, and dimethyl sulfoxide.

5. The method for photocatalytic desulfurization according to claim 1, wherein a radiation light source of the photocatalytic reaction is an ultraviolet lamp.

6. The method for photocatalytic desulfurization according to claim 1, wherein the photocatalytic reaction is carried out at 20° C. to 30° C.; and the photocatalytic reaction lasts for 120 minutes to 180 minutes.

* * * * *